(12) United States Patent
Kotaba

(10) Patent No.: US 8,503,730 B2
(45) Date of Patent: Aug. 6, 2013

(54) SYSTEM AND METHOD OF EXTRACTING PLANE FEATURES

(75) Inventor: Ondrej Kotaba, Orlova (CZ)

(73) Assignee: Honeywell International Inc., Morristown, NJ (US)

( * ) Notice: Subject to any disclaimer, the term of this patent is extended or adjusted under 35 U.S.C. 154(b) by 988 days.

(21) Appl. No.: 12/234,331

(22) Filed: Sep. 19, 2008

(65) Prior Publication Data

US 2010/0074473 A1    Mar. 25, 2010

(51) Int. Cl.
*G06K 9/00* (2006.01)

(52) U.S. Cl.
USPC .......................................................... 382/106

(58) Field of Classification Search
USPC .......................................................... 382/106
See application file for complete search history.

(56) References Cited

U.S. PATENT DOCUMENTS

| | | | |
|---|---|---|---|
| 4,891,630 | A | 1/1990 | Friedman et al. |
| 5,383,013 | A | 1/1995 | Cox |
| 5,870,490 | A | 2/1999 | Takahashi et al. |
| 6,911,995 | B2 | 6/2005 | Ivanov et al. |
| 7,203,342 | B2 | 4/2007 | Pedersen |
| 2007/0217682 | A1 | 9/2007 | Motomura et al. |
| 2007/0234230 | A1 | 10/2007 | Pedersen |
| 2008/0013836 | A1 | 1/2008 | Nakamura et al. |
| 2010/0104199 | A1* | 4/2010 | Zhang et al. ................... 382/199 |

FOREIGN PATENT DOCUMENTS

WO    0108098    2/2001

OTHER PUBLICATIONS

Pfister, S.T.; Burdick, J.W.;, "Multi-scale point and line range data algorithms for mapping and localization," Robotics and Automation, 2006. ICRA 2006. Proceedings 2006 IEEE International Conference on, vol., no., pp. 1159-1166, May 15-19, 2006.*

Uijt de Haag, M.; Venable, D.; Soloviev, A.;, "Implementation of a Flash-LADAR aided inertial navigator," Position, Location and Navigation Symposium, 2008 IEEE/ION, vol., No., pp. 560-567, May 5-8, 2008.*

Esther B. Meier and Frank Ade. Object detection and tracking in range image sequences by separation of image features. In IEEE International Conference on Intelligent Vehicles, pp. 280-284, 1998.*

Pfister, S.: Algorithms for mobile robot localization and mapping, incorporating detailed noise modeling and multi-scale feature extraction. Dissertation, California Institute of Technology (2006).*

Lin, Z., Kim, S., Kweon, I., 2005. Robust invariant features for object recognition and mobile robot navigation. In: Proc. Of IAPR Conf. Machine Vision Applications.*

European Patent Office, "European Search Report", Sep. 5, 2011, Published in: EP.

Haag, "Implementation of a Flash-LADAR Aided Inertial Navigator", May 5, 2008, pp. 560-567, Publisher: IEEE.

Pfister, "Multi-scale Point and Line Range Data Algorithms for Mapping and Localization", "Proceedings of the 2006 IEEE International Conference on Robotics and Automation", May 15, 2006, pp. 1159-1166, Publisher: IEEE.

* cited by examiner

*Primary Examiner* — Nirav G Patel
(74) *Attorney, Agent, or Firm* — Fogg & Powers LLC

(57) ABSTRACT

A navigation system comprises an image sensor operable to obtain range data for a first scene, and a processing unit coupled to the image sensor. The processing unit is operable to identify one or more plane features, based on the range data, using each of a plurality of scales. The processing unit is further operable to combine each of the one or more plane features with a corresponding plane feature from each of the plurality of scales and to project the one or more combined plane features to a reference orientation.

17 Claims, 4 Drawing Sheets

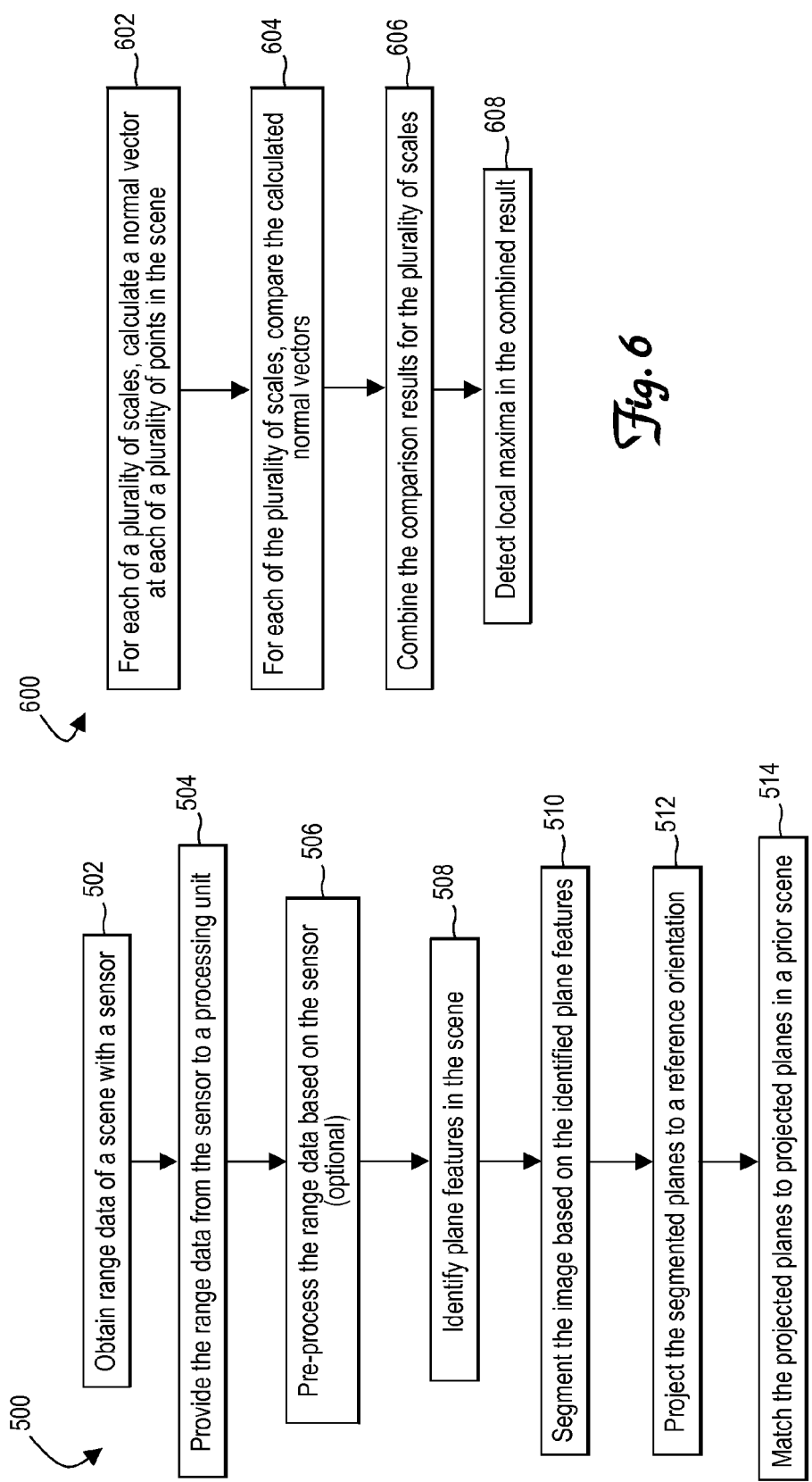

SYSTEM AND METHOD OF EXTRACTING PLANE FEATURES

BACKGROUND

Typical computer vision systems use point extraction to identify features in a scene. For example, typical techniques for identifying and extracting point features are Scale-invariant Feature Transform (SIFT), Speeded Up Robust Features (SURF), and Harris matrix. For example, typical techniques identify corners by detecting a change in gradient in the vertical and horizontal directions of the scene. In motion estimation systems, the identified corners or point features are correlated to point features in a prior scene and the difference in location is used to determine motion.

However, point extraction techniques are limited by perspective distortion. Perspective distortion refers to a change in the angle at which the scene is viewed. As the change in angle at which the image sensor views the scene increases, typical point extraction techniques become less effective in correlating point features. In fact, some typical point extraction techniques are unable to correlate or match any point features after a 45 degree change in view angle.

For the reasons stated above, and for other reasons stated below which will become apparent to those skilled in the art upon reading and understanding the present specification, there is a need in the art for an improved system and method of identifying and correlating features in a scene.

SUMMARY

The above mentioned problems and other problems are resolved by the present invention and will be understood by reading and studying the following specification.

In one embodiment a navigation system is provided. The navigation system comprises an image sensor operable to obtain range data for a first scene, and a processing unit coupled to the image sensor. The processing unit is operable to identify one or more plane features, based on the range data, using each of a plurality of scales. The processing unit is further operable to combine each of the one or more plane features with a corresponding plane feature from each of the plurality of scales and to project the one or more combined plane features to a reference orientation.

DRAWINGS

Understanding that the drawings depict only exemplary embodiments of the present invention and are not therefore to be considered limiting in scope, the exemplary embodiments will be described with additional specificity and detail through the use of the accompanying drawings, in which:

FIG. 5 is a flow chart depicting one embodiment of a method of performing navigation tasks.

FIG. 6 is a flow chart depicting one method of identifying plane features based on range data received from a 3D image sensor.

Figure 1:
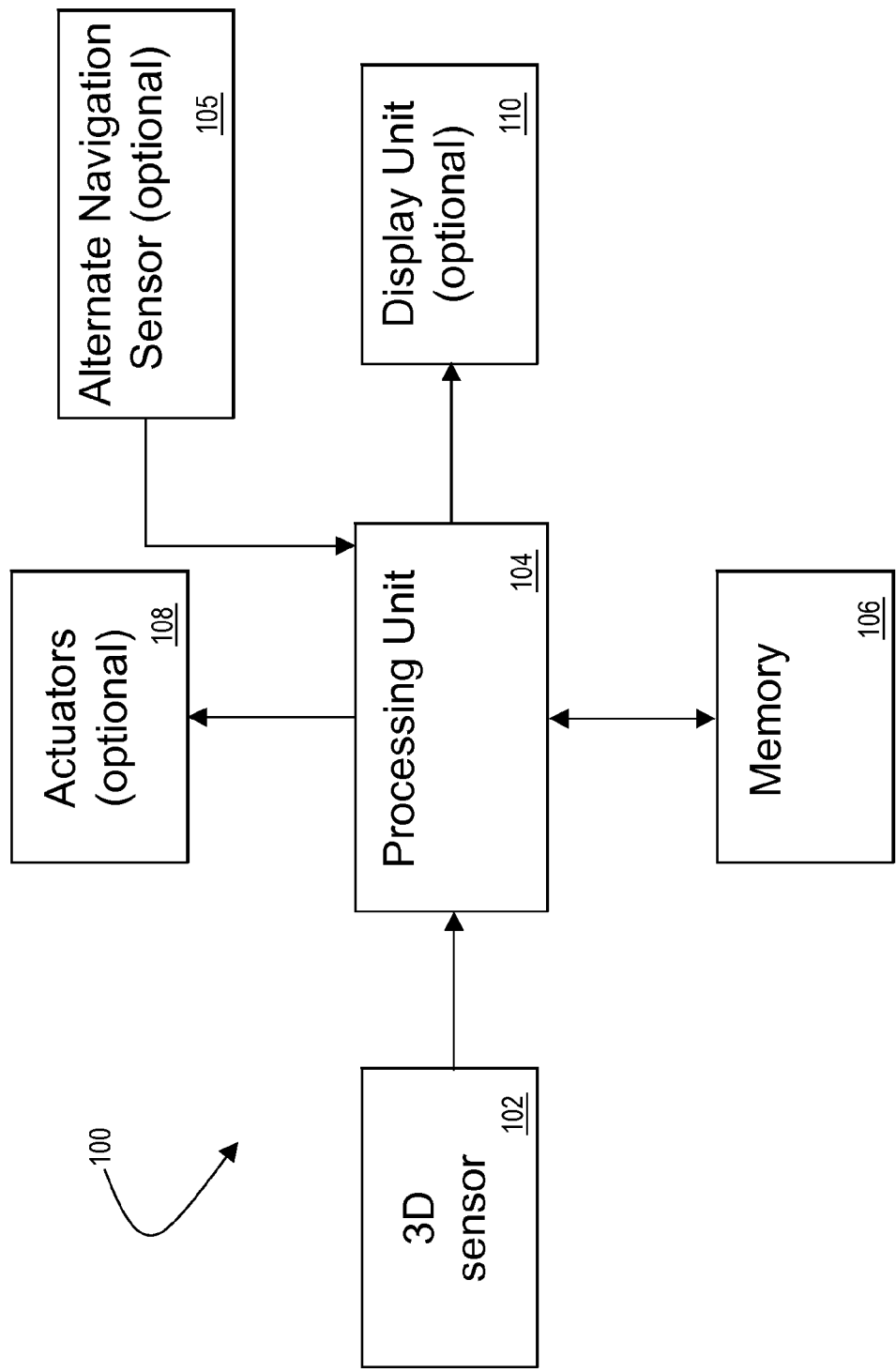
FIG. 1 is a block diagram depicting one embodiment of a navigation system.

In accordance with common practice, the various described features are not drawn to scale but are drawn to emphasize specific features relevant to the exemplary embodiments of the present invention.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. Furthermore, the method presented in the drawing figures or the specification is not to be construed as limiting the order in which the individual steps may be performed. The following detailed description is, therefore, not to be taken in a limiting sense.

The embodiments described below minimize the effects of perspective distortion in identifying and correlating scene features. In particular, the embodiments described below identify and correlate plane features rather than point features as in typical systems. In addition, the embodiments described below project identified plane features to a reference orientation in order to minimize the effects of view angle changes.

FIG. 1 is a high level block diagram depicting one embodiment of a navigation system 100. System 100 includes a sensor 102 coupled to a processing unit 104. Sensor 102 is operable to provide scene data to processing unit 104. As used herein, the term "scene" refers to an image of an area at a given moment in time. In addition, the scene data obtained by sensor 102 is a three dimensional (3D) point cloud or depth map which includes range data. Range data indicates the distance from the sensor to a given point in the scene. Any appropriate sensor which provides range data, such as 3D scanning or flash LIDAR cameras, can be used. One exemplary sensor capable of providing range data is the Swissranger SR-3000 manufactured by Mesa Imaging AG.

Processing unit 104 uses the range data provided by sensor 102 to identify plane features in the scene. A plane feature is a set of contiguous points, in a local area, in which the normal vector at each point is pointing in approximately the same direction (i.e. the orientation of each point is approximately the same). The normal vector is a vector which is orthogonal to a surface or plane fit through a plurality of adjacent points. Processing unit 104 calculates the normal vector at each point based on the range data provided by sensor 102. It should be noted that sensors 102 which provide range data, such as LIDAR, obtain range data in spherical coordinates (i.e. a horizontal angle, vertical angle, and distance). The spherical coordinates are converted to Cartesian coordinates, either by the sensor itself or by processing unit 102. In particular, the data at each point is converted to an [x,y,z] triplet in which $x=f1(i, j)$, $y=f2(i, j)$, and $z=f3(i, j)$, where i, and j are the indices of the pixel (thereby corresponding to the spherical angles of the original data) on which functions $f1$, $f2$, and $f3$ are performed.

The normal vector at a center point in a neighborhood is calculated, in one exemplary embodiment, by calculating cross-products of vectors from the given point to other points in the given point's neighborhood, based on the Cartesian data, as described below with respect to FIGS. 3A and 3B. In another exemplary embodiment, processing unit 104 calculates the gradients between the given point and its adjacent points. Processing unit 104 then derives the normal based on the gradients as described in more detail below with respect to FIG. 4.

In addition, processing unit 104 calculates the normal vector at each point using different scales. A scale refers to the number of points in each point's neighborhood (i.e. a mutual distance of points that are taken into account). As used herein, a neighborhood is a group of contiguous points in a local area. In addition, as used herein, a point's neighborhood is the neighborhood in which the point is the center point of the neighborhood.

Processing unit 104 compares the normal vector at points in a neighborhood for each scale. If the difference between the orientation of a normal vector at a neighborhood's center point and the orientation of a normal vector at other points in it's neighborhood is less than a specific threshold, the center point is considered part of the local plane feature. For example, in some embodiments the normal vector's orientation at the center point is compared to the normal vector orientation at each of the other points in the neighborhood. In other embodiments, the orientation of the normal vector at the center point is only compared to the orientation of the normal vector at boundary points. Processing unit 104 then combines the results from each scale. A local maxima is then identified in the combined result as the center of the local plane feature. An example of plane features identified at different scales are shown and described with respect to FIGS. 2A-2E below.

After identifying at least one plane feature and its center, processing unit 104 segments the scene to extract the identified plane features using techniques known to one of skill in the art, such as edge detection techniques. Processing unit 104 then projects the extracted plane features to a reference orientation (also referred to herein as normalizing the extracted plane features). For example, in this embodiment, processing unit 104 uses the orientation of the plane feature from the largest scale as the original orientation and an orientation facing or directed at sensor 102 as the reference orientation to which the extracted plane is projected. If system 100 rotates and moves between captured scenes, the plane features are still rotated to the same reference orientation. Hence, system 100 minimizes the effects of perspective distortion by normalizing each extracted plane feature to a reference orientation.

In this embodiment, processing unit 104 estimates motion by matching projected plane features from the current scene to the corresponding projected features in a previous scene stored in a memory 106. For example, in some embodiments, processing unit 104 uses techniques such as, but not limited to, Scale-invariant feature transform (SIFT), Speeded Up Robust Features (SURF), or other correlation techniques as known to one of skill in the art. Hence, in this embodiment, processing unit 104 utilizes the projected plane features for visual odometry. However, in other embodiments, processing unit 104 is operable to use the projected plane features for other navigation tasks, such as, but not limited to, integration of the observed scenes with map data to minimize misalignment of map data to the real world, and automatic map construction based on the observed scenes.

Additionally, in this embodiment, system 100 includes a display unit 110 and one or more actuators 108. However, it is to be understood that, in other embodiments, one or both of display unit 110 and actuators 108 are omitted. Display unit 110 is operable to display navigation data to a user. For example, if the projected plane features are used to estimate motion, the calculated position and orientation of system 100 is displayed to the user. Alternatively, if the projected plane features are used for map generation, the generated map is displayed to the user. Suitable display units include, but are not limited to, various CRT, active and passive matrix LCD, and plasma display units.

In some embodiments, processing unit 104 uses the estimated motion calculation to determine the necessary actions to take in order to reach a programmed destination and/or avoid obstacles. In some such embodiments, processing unit 104 generates control signals which are sent to actuators 108 to control the movement of a vehicle in which system 100 is located. For example, processing unit 104 can control the flight of an unmanned aerial vehicle (UAV) based on control signals transmitted to movement actuators (such as the throttle, wing flaps, etc.) in the UAV to control the pitch, yaw, thrust, etc. of the UAV. In other embodiments, the estimated motion calculation is used for fusion with data from other sensors, such as alternate navigation sensor 105, in order to achieve improved reliability and/or accuracy. For example, alternate navigation sensor 105 can be implemented as, but is not limited to, an inertial measurement unit (IMU), inertial navigation system (INS), attitude and heading reference system (AHRS), or other system enhanced by an optical subsystem.

Figure 2A:
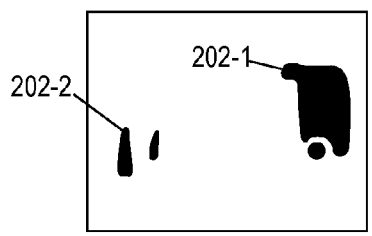
FIG. 2A depicts one embodiment of a scene with objects.
Figure 2B:
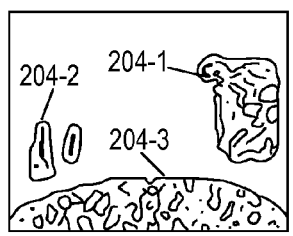
FIGS. 2B-2E depict one embodiment of exemplary plane features from different scales.
Figure 2C:
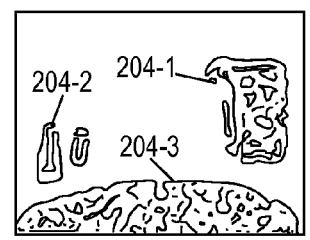
Figure 2D:
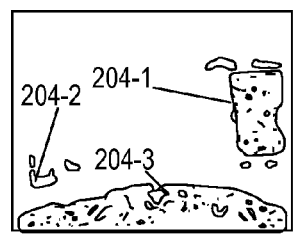
Figure 2E:
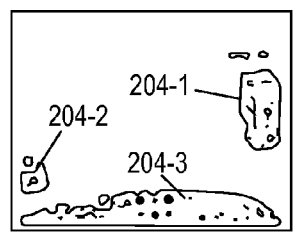

An example of plane features identified by a navigation system, such as navigation system 100 are shown in FIGS. 2A-2E. In particular, FIG. 2A depicts a scene with objects 202-1 and 202-2. FIG. 2B depicts identified plane features 204-1 and 204-2 using a first scale. Plane feature 204-1 corresponds with object 202-1 and plane feature 204-2 corresponds with plane feature 202-2. In addition, plane feature 204-3 is identified in FIG. 2B. Plane feature 204-3 corresponds to an apparently infinite plane. In particular, in this example, plane feature 204-3 is a ground plane. Plane feature 204-3 is identified as a ground plane based on determining that the normal vector is facing up towards the top of the scene. For purposes of motion estimation, apparently infinite planes, such as ground plane 204-3, are not used when matching or correlating plane features. It should be noted that ground plane 204-3 is provided by way of example only. An apparently infinite plane is not detected in all scenes or applications. For example, a ground plane, may not be detected if the vehicle motion is not planar, such as for an unmanned aerial vehicle (UAV).

FIGS. 2B-2E depict plane features 204-1, 204-2 and 204-3 identified at different scales. As can be seen, the shape and size of each plane feature depends on the scale size. Although only four scales are shown in FIGS. 2B-2E, it is to be understood that additional or fewer scale sizes can be used in other embodiments.

Figure 3B:
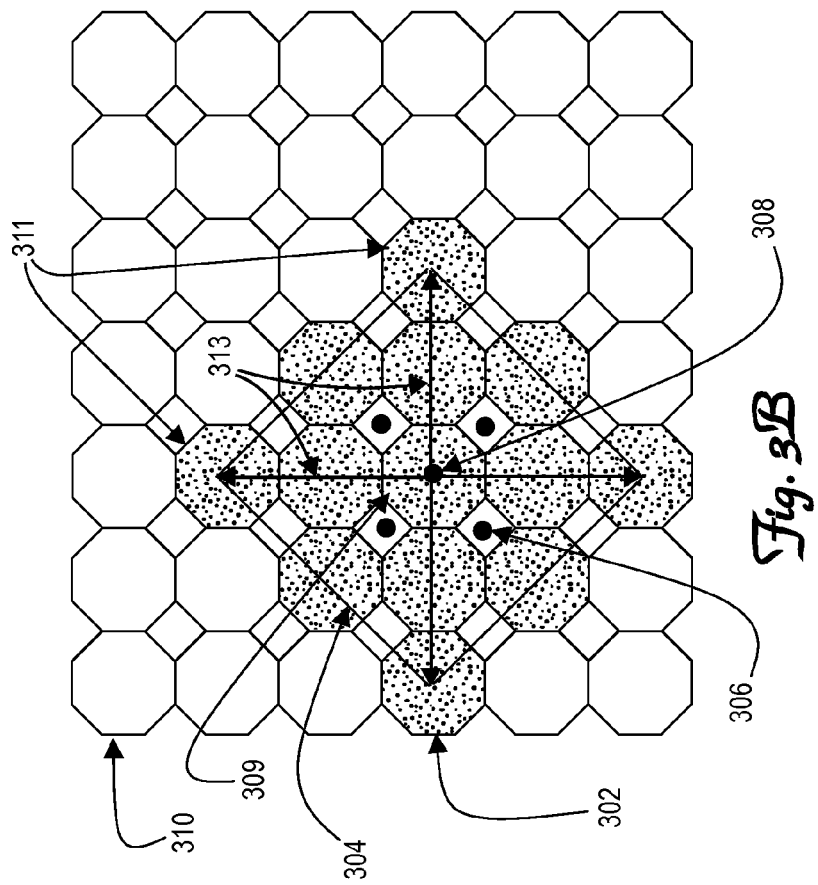
FIGS. 3A and 3B depict an embodiment of a technique of calculating a normal vector for two different scale sizes.
Figure 3A:
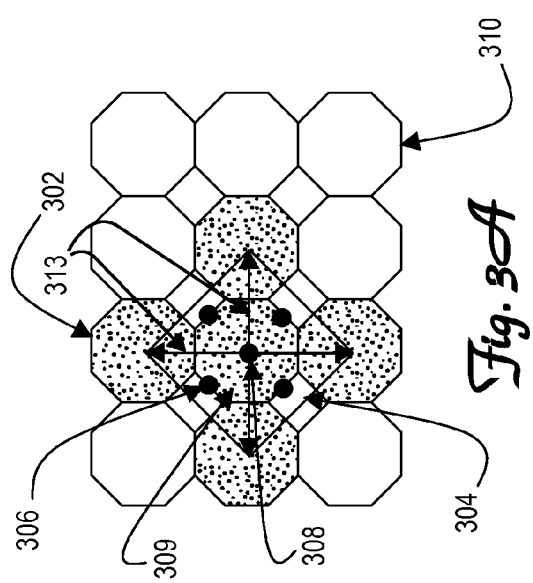

FIGS. 3A and 3B depict an exemplary technique of calculating a normal vector for two different scale sizes, respectively. As shown in FIG. 3A, neighborhood 302 includes 5 pixels of a plurality of pixels 310 in the scene. The five pixels can be grouped into groups of 3 to form four triangles 304 as shown. Two difference vectors 313 are calculated for each triangle 304. Each difference vector is a vector indicating the positional difference between the center pixel 309 and one of the other two pixels in the triangle 304. Each difference vector is calculated using the Cartesian coordinate data, including range data, which is converted from spherical coordinate data obtained from a sensor, as described above. Hence, the three pixels in each triangle 304 are defined in Cartesian coordinates as $p0=[x_0, y_0, z_0]$, $p1=[x_1, y_1, z_1]$, $p2=[x_2, Y_2, Z_2]$, where p0 represents center pixel 309. The two difference vectors are then defined as $d1=p1-p0$ and $d2=p2-p0$ and the corresponding normal vector 306 is $v=(p1-p0)\times(p2-p0)$. A cross-product of the two difference vectors for each triangle 304 is calculated to obtain a normal vector 306 located at the center of each triangle 304. The four normal vectors 306 are then used to obtain a linear approximation of the normal vector 308 at center pixel 309 of neighborhood 302.

Similarly, in FIG. 3B, four triangles 304 are formed. However, neighborhood 302, in FIG. 3B, has 13 pixels. Hence, the four triangles 304 are formed by scaling the triangles to each include center pixel 309 and two boundary pixels 311. Each of the two difference vectors 313 for each triangle 304 is calculated between the center pixel 309 and one of the two boundary pixels 311. The normal vector 306 of each triangle 304 is then obtained by calculating the cross-products between the two difference vectors. The four normal vectors 306 are then used to obtain a linear approximation of normal vector 308 at center pixel 309.

In an alternative embodiment, the four normal vectors 306 are compared directly with each other, rather than approximating normal vector 308 at center pixel 309. In such an embodiment, center pixel 309 is considered part of a local plane feature if the four normal vectors 306 are approximately pointing in the same direction. In this alternative embodiment, the need to compare adjacent calculated normal vectors at each point is avoided.

Figure 4:
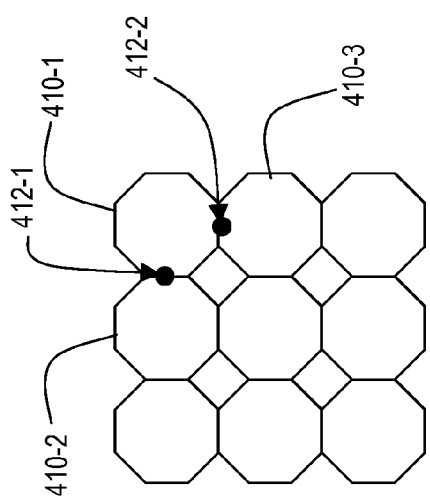
FIG. 4 depicts an alternate embodiment of a technique of calculating a normal vector

FIG. 4 depicts an alternate technique of calculating a normal vector. In FIG. 4, the normal vectors are obtained by calculating a gradient between the center point of adjacent neighborhoods. In this example, each neighborhood consists of one pixel, for purposes of explanation. However, it is to be understood that the gradient can be calculated for neighborhoods consisting of more than one pixel in other embodiments. In particular, in this embodiment, normal vector 412-1 is derived from a gradient calculated between pixels 410-1 and 410-2. In particular, a normal vector is chosen which is orthogonal to the calculated gradient. Similarly, normal vector 412-2 is derived from a gradient calculated between pixels 410-1 and 410-3. As can be seen, normal vectors 412 are shifted half a pixel between adjacent pixels rather than in the center of each pixel. However, this technique is relatively simple and fast compared to other techniques.

FIG. 5 is a flow chart depicting one embodiment of a method 500 of performing navigation tasks. Method 500 can be implemented in a system such as system 100 above. At 502, range data of a scene is obtained with an image sensor, such as image sensor 102. At 504, the range data is provided to a processing unit, such as processing unit 104. At 506, the processing unit optionally pre-processes the range data. As stated above, range data originally obtained in spherical coordinates is converted to Cartesian coordinates for use by the processing unit. Hence, the range data can be converted by the image sensor and provided to the processing unit in Cartesian coordinates or the range data can be provided in spherical coordinates and pre-processed by the processing unit to convert the spherical range data to Cartesian coordinates. In addition, pre-processing the range data helps remove noise in the range data and can be performed on the spherical coordinate range data and the converted Cartesian coordinate range data. For example, in some embodiments the processing unit performs a Gaussian blur on the range data. In other embodiments, a median filter is used by the processing unit.

At 508, plane features are identified based on the range data. In particular, as stated above, the processing unit uses the Cartesian coordinate range data in this example. FIG. 6, below, describes more details with respect to one embodiment of identifying plane features based on the range data. At 510, the identified plane features are extracted or segmented using image segmentation techniques known to one of skill in the art. At 512, the extracted plane features are projected to a reference orientation as discussed above. For example, in some embodiments the reference orientation is an orientation facing the image sensor. At 514, the projected plane features are analyzed to be used in the navigation task. In particular, in one embodiment the projected plane features are matched to corresponding plane features in a prior scene to estimate motion. In another embodiment, the projected plane features are used to generate navigation maps. In yet another embodiment, the projected plane features are integrated with map data to minimize misalignment of map data to the real world.

FIG. 6 is a flow chart depicting one method of identifying plane features based on range data received from a 3D image sensor. At 602, a normal vector is calculated at each of a plurality of points in a scene for each of a plurality of scales. At 604, for each of the plurality of scales, each of the calculated normal vectors is compared to a plurality of other calculated normal vectors in a neighborhood. For example, in some embodiments, the calculated normal for each point is compared to the normal vector of each of the point's neighborhood boundary points. If the difference between the orientation of a given point and the orientation of the boundary points is below a threshold, the given point is considered part of a local plane. If the difference in orientation exceeds the threshold, the given point is not considered part of the local plane. Alternatively, four normal vectors associated with difference vectors between a given point and boundary points are calculated as described above with respect to FIGS. 3A and 3B are calculated. The four normal vectors are then compared directly to determine if the given point is part of the local plane rather than deriving a normal vector at the given point for use in comparisons.

At 606, the comparison results for each of the plurality of scales are combined to form a composite result. In other words, one or more identified plane features from each scale are combined with corresponding plane features from each of the other scales. At 608, a local maxima is detected in each of the combined plane features. The local maxima for each of the combined plane features is considered the center of the respective plane feature. Hence, the plane features and their respective centers are identified based on range data.

All or some portions of the processing of range data described above can be implemented in software instructions tangibly embodied on a computer readable medium and executed by a processing unit such as processing unit 104. Such computer readable media can be any available media that can be accessed by a general purpose or special purpose computer or processor, or any programmable logic device. Suitable computer readable media may include storage or memory media such as magnetic or optical media, e.g., disk or CD-ROM, volatile or non-volatile media such as RAM (e.g., SDRAM, DDR SDRAM, RDRAM, SRAM, etc.), ROM, EEPROM, flash memory, etc. as well as transmission media such as electrical, electromagnetic, or digital signals, conveyed via a communication medium such as a network and/or a wireless link Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A navigation system, comprising:
   an image sensor operable to obtain range data for a first scene; and
   a processing unit coupled to the image sensor and operable to identify one or more plane features, based on the range data, using each of a plurality of scales;
   wherein the processing unit is further operable to combine each of the one or more plane features with a corresponding plane feature from each of the plurality of scales and to project the one or more combined plane features to a reference orientation.

2. The system of claim 1, wherein the processing unit is further operable to estimate motion by comparing a location of the one or more projected plane features in the first scene with a location of one or more corresponding projected plane features in a second scene.

3. The system of claim 2, further comprising:
   at least one alternate navigation sensor operable to provide a motion estimate to the processing unit; wherein the processing unit is further operable to combine the estimated motion based on the location of the one or more projected plane features in the first and second scenes with the motion estimate provided by the at least one alternate navigation sensor.

4. The system of claim 1, wherein the processing unit is operable to identify one or more plane features by:
   calculating a normal vector at each of a plurality of points; and
   comparing the difference between the normal vectors at each of the plurality of points with a threshold;
   wherein each point, for which the difference is below the threshold, is determined to be a part of a plane feature.

5. The system of claim 4, wherein the processing unit is operable to calculate the normal vector at each of the plurality of points by:
   calculating a plurality of cross-products, each between two difference vectors, wherein each difference vector represents the difference between a selected one of the plurality of points and a boundary point of the selected point's neighborhood; and
   approximating the normal vector at the selected point based on the plurality of cross-products.

6. The system of claim 4, wherein the processing unit is operable to calculate the normal vector at each of the plurality of points by:
   calculating a gradient between the center points of adjacent neighborhoods; and
   deriving the normal vector from the calculated gradients.

7. The system of claim 1, wherein the processing unit is operable to identify one or more plane features by:
   calculating, for a selected one of a plurality of points, a plurality of cross-products, each cross-product between two difference vectors, wherein each difference vector represents the difference between the selected point and a boundary point of the selected point's neighborhood; and
   comparing the difference between the plurality of cross-products for the selected point with a threshold;
   wherein if the difference is below the threshold, the selected point is determined to be a part of a plane feature.

8. The system of claim 1, wherein the processing unit is operable to project the one or more combined plane features to the reference orientation based on a normal vector of the corresponding one or more plane features from a largest scale of the plurality of scales.

9. A method of performing navigation tasks, the method comprising:
   obtaining range data of a first scene with an image sensor;
   providing the range data from the image sensor to a processing unit;
   identifying one or more plane features in the scene based on the range data;
   segmenting the scene based on the one or more identified plane features;
   projecting the one or more segmented plane features to a static reference orientation; and
   analyzing the one or more projected plane features;
   wherein identifying one or more plane features based on the range data comprises:
   for each of a plurality of scales, calculating a normal vector at each of a plurality of points in the scene;
   for each of the plurality of scales, comparing the difference between the normal vectors at the plurality of points with a threshold, wherein each point, for which the difference is below a threshold, is determined to be a part of one of the one or more plane features;
   combining the one or more plane features with corresponding plane features from each of the plurality of scales; and
   detecting a local maxima in each of the one or more combined plane features;
   wherein calculating a normal vector at each of the plurality of points comprises:
   calculating a plurality of cross-products, each between two difference vectors, wherein each difference vector represents the difference between a selected one of the plurality of points and a boundary point of the selected point's neighborhood; and
   approximating the normal vector at the selected point based on the plurality of cross-products.

10. The method of claim 9 wherein analyzing the one or more projected plane features comprises matching the one or more projected plane features to corresponding projected plane features in a second scene.

11. The method of claim 9, wherein projecting the one or more segmented plane features to a reference orientation comprises projecting the one or more segmented plane features to the reference orientation based on the normal vector of the corresponding one or more plane features from the largest scale.

12. A program product comprising program instructions embodied on a processor-readable non-transitory storage medium for execution by a programmable processor, wherein the program instructions are operable to cause the programmable processor to:
   calculate, for each of a plurality of scales, a normal vector at each of a plurality of points in a first scene based on range data received from an image sensor;
   compare, for each of the plurality of scales, the difference between the normal vectors at the plurality of points with a threshold, wherein each point, for which the difference is below a threshold, is determined to be a part of a plane feature;
   combine the plane feature with a corresponding plane feature from each of the plurality of scales; and
   detect a local maxima in the combined plane feature.

13. The program product of claim 12, wherein the program instructions are further operable to cause the programmable processor to calculate the normal vector at a selected one of the plurality of points by calculating a plurality of cross-products, each between two difference vectors, wherein each difference vector represents the difference between the selected point a boundary point of the selected point's neighborhood; and by approximating the normal vector at the selected point based on the plurality of cross-products.

14. The program product of claim 12, wherein the program instructions are further operable to cause the programmable processor to calculate the normal vector at each of the plurality of points by calculating a gradient between the center points of adjacent neighborhoods and deriving the normal vector from the calculated gradients.

15. The program product of claim 12, wherein the program instructions are further operable to cause the programmable processor to:
   segment the scene based on the combined plane feature;
   project the segmented plane feature to a reference orientation based on a normal vector of the corresponding plane feature from largest scale of the plurality of scales; and
   match the projected plane feature to a corresponding projected plane feature in a second scene.

16. The program product of claim 12, wherein the program instructions are further operable to cause the programmable processor to convert the range data received from the image sensor to a Cartesian coordinate system.

17. The program product of claim 12, wherein the program instructions are further operable to cause the programmable processor to:
   calculate, for a selected one of a plurality of points, a plurality of cross-products, each cross-product between two difference vectors, wherein each difference vector represents the difference between the selected point and a boundary point of the selected point's neighborhood; and
   compare the difference between the plurality of cross-products for the selected point with a threshold;
   wherein if the difference is below the threshold, the selected point is determined to be a part of a plane feature.

* * * * *